No. 791,432. PATENTED MAY 30, 1905.
H. G. ROTH.
COVER FOR DISPLAY JARS.
APPLICATION FILED FEB. 14, 1905.
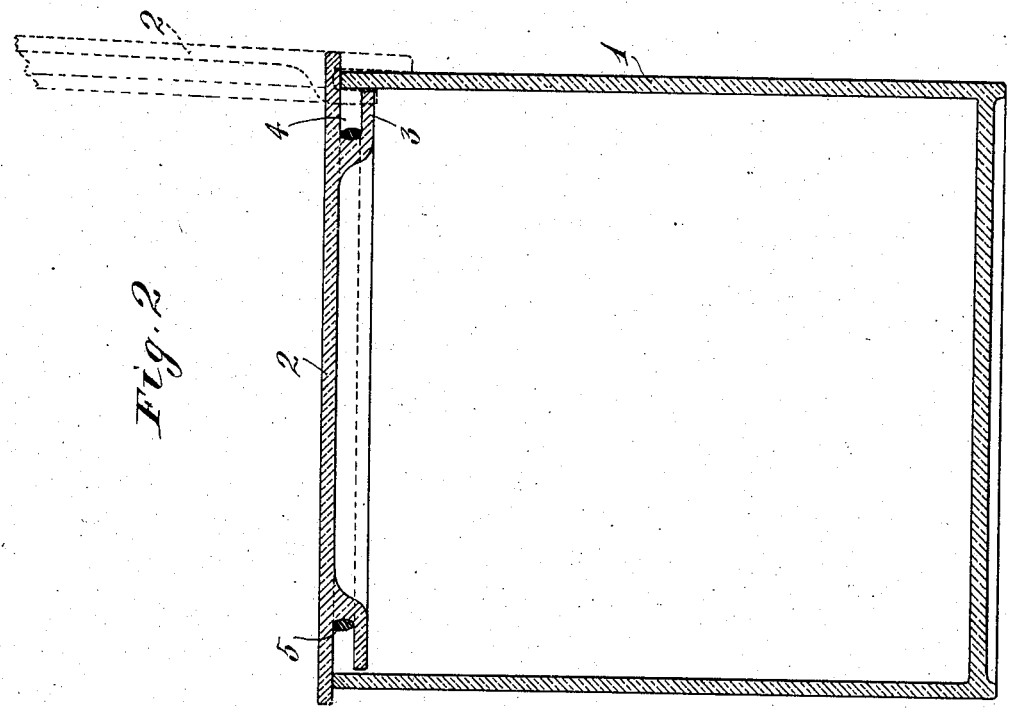
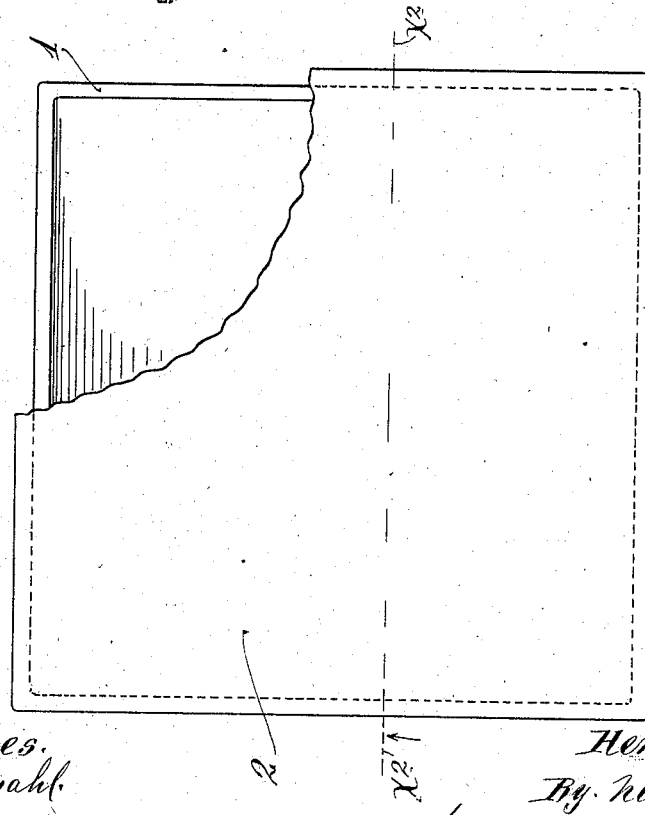
Witnesses.
A. H. Opsahl.
E. W. Jeppesen.
Inventor
Henry G. Roth.
By his Attorneys.
Williamson & Merchant No. 791,432. Patented May 30, 1905.

UNITED STATES PATENT OFFICE.

HENRY G. ROTH, OF MINNEAPOLIS, MINNESOTA.

COVER FOR DISPLAY-JARS.

SPECIFICATION forming part of Letters Patent No. 791,432, dated May 30, 1905.

Original application filed December 8, 1904, Serial No. 235,924. Divided and this application filed February 14, 1905. Serial No. 245,638.

*To all whom it may concern:*

Be it known that I, HENRY G. ROTH, a citizen of the United States, residing at Minneapolis, in the county of Hennepin and State of Minnesota, have invented certain new and useful Improvements in Covers for Display-Jars; and I do hereby declare the following to be a full, clear, and exact description of the invention, such as will enable others skilled in the art to which it appertains to make and use the same.

My present invention relates to covers for display-jars adapted for use in stores and elsewhere to contain various articles to be sold, and has for its object to improve the construction of such covers in the several particulars hereinafter noted.

The invention consists of the novel devices and combinations of devices hereinafter described, and defined in the claims.

The application is filed as a division of my pending application, Serial No. 235,924, filed of date December 8, 1904, and entitled "Retail display-jars."

In the accompanying drawings, which illustrate my present invention, like characters indicate like parts throughout both views.

Figure 1 is a plan view of the improved cover applied to a jar, some parts being broken away; and Fig. 2 is a vertical section taken on the line $x^2 x^2$ of Fig. 1.

The numeral 1 indicates a rectangular jar, which is constructed of glass or other suitable material. The jar 1 is adapted to be closed by a removable lid or cover 2, which, as shown, is rectangular and rests upon the upper edge of said jar, with its marginal portion projecting slightly beyond. Said cover 2 is formed with a depending and outwardly-turned horizontal flange 3, that extends entirely around the said cover 2, but terminates inward of the margin thereof, and is spaced apart therefrom, so as to afford a marginal channel 4. The said flange 3 fits loosely within the jar 1 and serves to hold the cover in proper position. A pliable endless packing 5, of rubber, leather, or other suitable material, is placed in the bottom of the channel 4. When the lid or cover 2 is turned into an approximately vertical position, as shown by dotted lines, Fig. 2, it is adapted to be detachably interlocked with the upper portion of any one side of the jar 1 by dropping the same with one side of the channel 4 onto the said side of the jar. When the jar-cover is thus engaged with the side of the jar 1, the engaging portion of the flange 3 and the opposite marginal portion of the cover 2 embrace the edge of the jar and prevent the cover from falling either inward or outward. Otherwise stated, the cover is then detachably interlocked with the side flange of the jar 1 and is held in an upright position. It is evident that the cover may be easily detached from the flange of the jar when it is desired to turn the same down, simply by raising the cover slightly as a preliminary step. It is also evident that the cover may be turned to any one side of the jar and interlocked therewith, as above described.

The term "jar" is used broadly to indicate various receptacles—such as boxes, cans, &c.—as well as those usually designated as "jars."

What I claim, and desire to secure by Letters Patent of the United States, is as follows:

1. The combination with a polygonal jar, of a cover therefor having a marginal groove extending in the plane of said cover, and engageable with the upper edge of said jar to hold said cover in an upright position, substantially as described.

2. The combination with a polygonal jar, of a cover therefor having a depending marginal flange 3 affording a marginal channel 4, said flange 3 fitting within said jar and said channel 4 being adapted for engagement with the upper edges of said jar to hold said cover in an upright position, substantially as described.

3. The combination with a polygonal jar, of a cover therefor having a depending marginal flange 3, spaced apart therefrom to afford a marginal channel 4, and the pliable packing 5 placed in the bottom of said channel 4, which flange 3 is adapted to fit within said jar and which channel 4 is adapted to engage the upper edge of said jar to hold said cover in an upright position, substantially as described.

In testimony whereof I affix my signature in presence of two witnesses.

HENRY G. ROTH.

Witnesses:
H. D. KILGORE,
F. D. MERCHANT.